US012318694B2

(12) United States Patent
Liu (10) Patent No.: US 12,318,694 B2
(45) Date of Patent: Jun. 3, 2025

(54) VIRTUAL PROP CONTROL METHOD AND APPARATUS, STORAGE MEDIUM AND ELECTRONIC DEVICE

(71) Applicant: TENCENT TECHNOLOGY (SHENZHEN) COMPANY LIMITED, Guangdong (CN)

(72) Inventor: Zhi Hong Liu, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 261 days.

(21) Appl. No.: 17/673,341

(22) Filed: Feb. 16, 2022

(65) Prior Publication Data

US 2022/0168647 A1    Jun. 2, 2022

Related U.S. Application Data

(63) Continuation of application No. PCT/CN2020/126164, filed on Nov. 3, 2020.

(30) Foreign Application Priority Data

Jan. 2, 2020   (CN) .......................... 202010002220.3

(51) Int. Cl.
*A63F 13/573*   (2014.01)
*A63F 13/428*   (2014.01)
(Continued)

(52) U.S. Cl.
CPC .......... *A63F 13/573* (2014.09); *A63F 13/428* (2014.09); *A63F 13/5372* (2014.09); *A63F 13/58* (2014.09); *G06T 11/203* (2013.01)

(58) Field of Classification Search
CPC ............................... A63F 13/573; A63F 13/58
See application file for complete search history.

(56) References Cited

U.S. PATENT DOCUMENTS

2010/0095249 A1* 4/2010 Yoshikawa ........... A63F 13/577
                                                              345/419
2013/0038603 A1* 2/2013 Bae ....................... A63F 13/285
                                                              345/204
(Continued)

FOREIGN PATENT DOCUMENTS

CN    109200582 A    1/2019
CN    110025954 A    7/2019
(Continued)

OTHER PUBLICATIONS

"Poison Bomb," available at https://mcleodgaming.fandom.com/wiki/Poison_Bomb?oldid=151307, published Apr. 18, 2019 (Year: 2019).*

(Continued)

*Primary Examiner* — Jay Trent Liddle
(74) *Attorney, Agent, or Firm* — Sughrue Mion, PLLC (57) ABSTRACT

The disclosure provides a virtual prop control method and apparatus, a storage medium, and an electronic device. The method includes displaying a target virtual throw prop controlled by a first virtual operation object in a target game application. The method also includes controlling the throwing of the target virtual throw prop based on a target throw operation. The method also includes setting a target region at which the virtual throw prop is thrown as a damage detection region, with the damage detection region configured to reduce hit points of at least one target virtual operation object located in the damage detection region. Based on a second virtual operation object being included in the at least one target virtual operation object and entering the target region, the method also includes reducing hit points of the second virtual operation object.

12 Claims, 4 Drawing Sheets

Burning flame 302

(51) Int. Cl.
   *A63F 13/5372* (2014.01)
   *A63F 13/58* (2014.01)
   *G06T 11/20* (2006.01)

(56) References Cited

U.S. PATENT DOCUMENTS

2016/0279522 A1* 9/2016 de Plater ............ A63F 13/58
2018/0345148 A1* 12/2018 Matsumiya ........... A63F 13/837
2019/0155384 A1* 5/2019 Fajt ................. G06F 17/10
2019/0366213 A1 12/2019 Zhou

FOREIGN PATENT DOCUMENTS

| CN | 110585706 A | 12/2019 |
| CN | 110585712 A | 12/2019 |
| CN | 110585731 A | 12/2019 |
| CN | 111202982 A | 5/2020 |

OTHER PUBLICATIONS

"Molotov Cocktail," PUBG Wiki, available as early as Nov. 6, 2017, available at https://pubg.fandom.com/wiki/Molotov_Cocktail?oldid=27472 (Year: 2017).*

"Damage over Time," Wowpedia, Aug. 15, 2018, available at https://wowpedia.fandom.com/wiki/Damage_over_Time?oldid=5062597 (Year: 2018).*

"World War Z: An operation and a skills tree of exploding (Exterminator), a tail of **", [online] https://game-hashirigaki.site/tps/wwz-extaminator/, 2019, 9 pages.

"Gasoline tank! Details of blasting and gasoline spraying", GameWith, [online] https://gamewith.jp/knives-out/article/show/117687, 2019, 16 pages.

Japanese Office Action dated Jul. 24, 2023 issued in Application No. 2022-518799.

Translation of the Written Opinion dated Feb. 3, 2021 issued by the International Searching Authority in PCT/CN2020/126164.

[PUBG Mobile], Youtube online video published Feb. 25, 2019 (7 pages total) Accessed via the Internet: https://www.youtube.com/watch?v=PHuu-JHibrY (7 pages total).

"Throw Arms Which Can be Used by PUBG—that of Introduction and PC Gamer", Mar. 13, 2018 (2 pages total), Accessed via the Internet: http://video-game.site/PCgames/grenade/.

Office Action issued Mar. 13, 2023 in Japanese Application No. 2022-518799.

"Full Strategy of Gas Bomb in Wilderness Action, Place to get Gas Bomb", Aug. 22, 2018, 2 pgs., https://wap.gamersky.com/gl/Content-1090103.html.

Written Opinion of the International Searching Authority for PCT/CN2020/126164 dated, Feb. 3, 2021 (PCT/ISA/237).

International Search Report for PCT/CN2020/126164 dated, Feb. 3, 2021 (PCT/ISA/210).

"Battlegrounds 1.0 version 14th patch notes!! Grenade upgrade, M24 world drop?!!!!", May 31, 2018 (5 pages) <https://blog.naver.com/andb2017/221288429987>.

Korean Office Action dated Apr. 12, 2024 in Application No. 10-2022-7014970.

Office Action issued Dec. 18, 2024 in Korean Application No. 10-2022-7014970.

Office Action (including Search Report and Written Opinion) issued Jan. 1, 2025 in Singapore Application No. 11202203955W.

"What if you ignite it repeatedly?", League of Legends, Post on internet, 2015 (4 pages total) <https://www.inven.co.kr/board/lol/2772/161906>.

* cited by examiner

VIRTUAL PROP CONTROL METHOD AND APPARATUS, STORAGE MEDIUM AND ELECTRONIC DEVICE

CROSS-REFERENCE TO RELATED APPLICATION(S)

This application is a continuation application of International Application No. PCT/CN2020/126164, filed Nov. 3, 2020, which claims priority to a Chinese Patent Application No. 202010002220.3 filed on Jan. 2, 2020 with the China National Intellectual Property Administration, the disclosures of which are incorporated herein by reference in their entireties.

FIELD

This disclosure relates to the field of computers, and in particular, to a virtual prop control method and apparatus, a storage medium, and an electronic device.

BACKGROUND

In a virtual shooting game, when two opposing sides are at a standoff and neither can win, if one of the sides uses a prop or weapon that can kill or wound the enemy within their range, their chances of winning greatly improve. A relatively commonly used prop or weapon is the grenade. After a grenade is thrown at the opposing side, a specific range of kill and wound may occur, causing the opposing side to lose health points, and helping achieve victory.

However, there are several disadvantages to using a grenade. That is, while the grenade causes instantaneous damage, and it can only take effect when it hits, which makes it impossible to cause continuous and effective damage to the enemy. In other words, in related art, the manner of controlling virtual props is relatively undiversified when virtual operation objects are in a battle.

SUMMARY

Example Embodiments of the disclosure provide a virtual prop control method and apparatus, a storage medium, and an electronic device, which can improve the diversity of control manners of virtual throw props.

Embodiments of the present disclosure provide a virtual prop control method, including: displaying, in a target game application, a target virtual throw prop controlled by a first virtual operation object; controlling, based on a target throw operation being detected, the first virtual operation object to throw the target virtual throw prop, the target throw operation being used for throwing the target virtual throw prop; setting a target region in the target game application as a damage detection region within a first predetermined duration, the target region including a point of fall to which the target virtual throw prop is thrown, the damage detection region being set to reduce hit points of at least one target virtual operation object located in the damage detection region, and the first virtual operation object and the at least one target virtual operation object respectively belonging to different virtual operation object sets; and continuously reducing hit points of a second virtual operation object within a second predetermined duration based on the target region being the damage detection region and the second virtual operation object entering the target region, the at least one target virtual operation object including the second virtual operation object.

An embodiment of the disclosure further provides a virtual prop control method, including: displaying, in a target game application, a target virtual throw prop controlled by a first virtual operation object; controlling, based on a target throw operation being detected, the first virtual operation object to throw the target virtual throw prop, the target throw operation being used for throwing the target virtual throw prop; setting a target region in the target game application as a damage detection region within a first predetermined duration, the target region including a point of fall to which the target virtual throw prop is thrown, the damage detection region being set to change an attribute value of at least one target virtual operation object located in the damage detection region, and the first virtual operation object and the at least one target virtual operation object respectively belonging to different virtual operation object sets; and continuously changing an attribute value of a second virtual operation object within a second predetermined duration based on the target region being the damage detection region and the second virtual operation object entering the target region, the at least one target virtual operation object including the second virtual operation object.

An embodiment of the disclosure further provides a virtual prop control apparatus comprising at least one memory configured to store program code; and at least one processor configured to read the program code and operate as instructed by the program code, the program code comprising: first displaying code configured to cause the at least one processor to display, in a target game application, a target virtual throw prop controlled by a first virtual operation object; first controlling code configured to cause the at least one processor to control, based on a target throw operation being detected, the first virtual operation object to throw the target virtual throw prop based on a target throw operation being detected, the target throw operation being used for throwing the target virtual throw prop; first setting code configured to cause the at least one processor to set a target region in the target game application as a damage detection region within a first predetermined duration, the target region comprising a point of fall to which the target virtual throw prop is thrown, the damage detection region being set to change an attribute of at least one target virtual operation object located in the damage detection region, and the first virtual operation object and the at least one target virtual operation object respectively belonging to different virtual operation object sets; and first changing code configured to cause the at least one processor to continuously change an attribute of a second virtual operation object within a second predetermined duration based on the target region being the damage detection region and the second virtual operation object entering the target region, the at least one target virtual operation object comprising the second virtual operation object.

An embodiment of the disclosure further provides a non-transitory computer-readable storage medium, storing a program that is executable by at least one processor to perform: displaying, in a target game application, a target virtual throw prop controlled by a first virtual operation object; controlling, based on a target throw operation being detected, the first virtual operation object to throw the target virtual throw prop, the target throw operation being used for throwing the target virtual throw prop; setting a target region in the target game application as a damage detection region within a first predetermined duration, the target region comprising a point of fall to which the target virtual throw prop is thrown, the damage detection region being set to reduce hit points of at least one target virtual operation object located in the damage detection region, and the first virtual operation object and the at least one target virtual operation object respectively belonging to different virtual operation object sets; and continuously reducing hit points of a second virtual operation object within a second predetermined duration, based on the target region being the damage detection region and the second virtual operation object entering the target region, the at least one target virtual operation object comprising the second virtual operation object.

An embodiment of the disclosure further provides an electronic device, including a memory, a processor, and a computer program stored in the memory and executable on the processor, the processor performing, through the computer program, the virtual prop control method provided in the embodiments of the disclosure.

In the embodiments of this application, a target virtual throw prop controlled by a first virtual operation object is displayed in a target game application, the first virtual operation object is controlled to throw the target virtual throw prop based on a target throw operation being detected; a target region in the target game application is set as a damage detection region within a first predetermined duration; and based on the target region being the damage detection region and a second virtual operation object entering the target region, hit points of the second virtual operation object are continuously reduced within a second predetermined duration. The damage detection region created by the target virtual throw prop controlled by the first virtual operation object causes continuous damage to an enemy virtual operation object located in the damage detection region. Thus, because a single target virtual throw prop causes continuous damage, diversity of control manners of virtual throw props is increased and users are allowed more flexibility, which in turn improves the man-machine interaction efficiency and reducing occupation of hardware processing resources.

BRIEF DESCRIPTION OF THE DRAWINGS

The accompanying drawings described herein are used for providing further understanding for the disclosure and constitute a part of the disclosure. Example embodiments of the disclosure and descriptions thereof are used for explaining the disclosure and do not constitute an improper limitation to the disclosure.

DETAILED DESCRIPTION

In order to make a person skilled in the art better understand the solutions of the disclosure, the following clearly and completely describes the technical solutions in the embodiments of the disclosure with reference to the accompanying drawings in the embodiments of the disclosure. The described embodiments are only some rather than all of the embodiments of the disclosure. All other embodiments obtained by a person of ordinary skill in the art based on the embodiments of the disclosure without creative efforts shall fall within the protection scope of the disclosure.

The terms such as "first" and "second" in the specification, the claims, and the foregoing accompanying drawings of the disclosure are intended to distinguish between similar objects, but are not necessarily used for describing a specific sequence or a chronological order. It is to be understood that the data termed in such a way are interchangeable in appropriate circumstances, so that the embodiments of the disclosure described herein can be implemented in orders other than the order illustrated or described herein. Moreover, the terms "including", "containing," "comprising," "having," and any other variants mean to cover non-exclusive inclusion, for example, a process, method, system, product, apparatus, or device that includes a list of steps or units is not necessarily limited to those expressly listed steps or units, but may include other steps or units not expressly listed or inherent to such a process, method, system, product, apparatus, or device.

Figure 1:
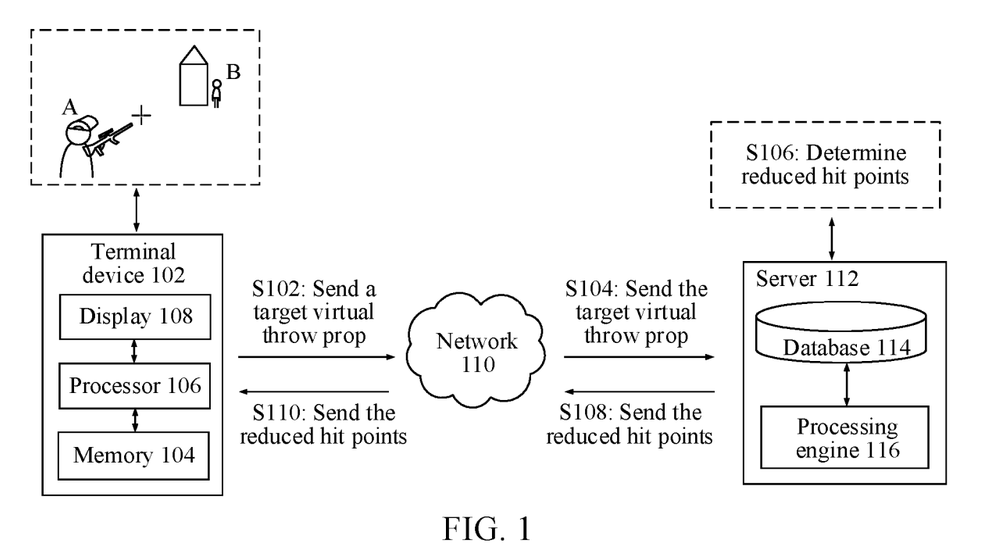
FIG. 1 is a schematic diagram of an application environment of a virtual prop control method according to an example embodiment of the disclosure.

FIG. 1 is a schematic diagram of an application environment of a virtual prop control method. As shown in FIG. 1, in the embodiments of the disclosure, the virtual prop control method is applicable to, but not limited to, a server 112 configured to assist an application client in displaying a burning flame in a target region. The application client may run on, but not be limited to running on, a terminal device 102. The terminal device 102 may include but not be limited to a terminal device that supports running of an application client such as a mobile phone, a tablet computer, a notebook computer, or a personal computer (PC). The server 112 and the terminal device 102 may perform data exchange with each other through a network, and the network may include, but may not be not limited to, a wireless network or a wired network. The wireless network may include: Bluetooth, Wi-Fi, and another network implementing wireless communication. The wired network may include: a wide area network, a metropolitan area network, and a local area network. The foregoing description is merely an example, and is not a limitation of embodiments in the disclosure. A game client may run on the terminal device 102. The game client is configured to control a first virtual operation object to throw a firebomb that can cause continuous damage, to a second virtual operation object to complete a game task in a game scene.

The server may include, but may not be limited to, any hardware device that is capable of performing computation, for example, an independent physical server, a server cluster including a plurality of physical servers or a distributed system, or a cloud server providing basic cloud computing services, such as a cloud service, a cloud database, cloud computing, a cloud function, cloud storage, a network service, cloud communication, a middleware service, a domain name service, a security service, big data, and an artificial intelligence platform.

The terminal device 102 may include, but not be limited to, a display 108, a processor 106, and a memory 104. The display 108 is configured to obtain a man-machine interaction instruction by using a man-machine interaction interface, and is further configured to present a game picture in the game task. The processor 106 is configured to control, in response to the man-machine interaction instruction, the first virtual operation object to perform a specified operation to complete the game task. The memory 104 is configured to store attribute information of the first virtual operation object, and attribute information of a virtual prop to be thrown by the first virtual operation object. The server herein may include, but not be limited to, a database 114 and a processing engine 116. The processing engine 116 is configured to invoke the information stored in the database 114 to: based a target virtual throw prop and a virtual object colliding with each other in a target region, set the target region as a damage detection region, display a burning flame in the damage detection region, and continuously reduce hit points of a second virtual operation object located in the damage detection region, so that the first virtual operation object causes continuous damage to the second virtual operation object by controlling the target virtual throw prop, thereby achieving the effect that virtual operation objects can control virtual props with and/or cause continuous damage functions during a battle.

In some embodiments, the display 108 in the terminal device 102 displays an interaction interface of running a round of game task by the game client (where the game shown in FIG. 1 is a shooting game, and a first virtual operation object is throwing a virtual throw prop to a virtual object). In some embodiments, the target game application may be a shooting game application. In steps S102 to S110, a target virtual throw prop controlled by the first virtual operation object and displayed in the target game application (e.g., a target shooting application) is obtained, and the target virtual throw prop is sent to the server 112 by using a network 110. When a target throw operation is detected, the server 112 controls the first virtual operation object to throw the target virtual throw prop, wherein the target throw operation is used for throwing the target virtual throw prop; sets a target region in the target game application as a damage detection region within a first predetermined duration, wherein the target region includes a point of fall to which the target virtual throw prop is thrown, wherein the damage detection region is set to reduce hit points of at least one target virtual operation object located in the damage detection region; and continuously reduces, when the target region is the damage detection region and a second virtual operation object enters the target region, hit points of the second virtual operation object within a second predetermined duration. Subsequently, the determined reduced hit points of the second virtual operation object are returned to the terminal device 102. Therefore, the hit points of the second virtual operation object are continuously reduced achieving an effect of improving diversity of control manners of virtual throw props.

The following describes a virtual prop control method provided in the embodiments of the disclosure. In some embodiments, an electronic device displays a target virtual throw prop controlled by a first virtual operation object in a target game application; controls, when a target throw operation is detected, the first virtual operation object to throw the target virtual throw prop, the target throw operation being used for throwing the target virtual throw prop; sets a target region in the target game application as a damage detection region within a first predetermined duration, the target region including a point of fall to which the target virtual throw prop is thrown, the damage detection region being set to change an attribute value of at least one target virtual operation object located in the damage detection region, and the first virtual operation object and the at least one target virtual operation object respectively belonging to different virtual operation object sets; and continuously changes, when the target region is the damage detection region and a second virtual operation object enters the target region, an attribute value of the second virtual operation object within a second predetermined duration, the at least one target virtual operation object including the second virtual operation object.

According to embodiments, the attribute value of the target virtual operation object may be hit points, mana points, an energy value, a field of view, or the like of the target virtual operation object. When the target virtual operation object is located in the damage detection region, the attribute value of the target virtual operation object is changed. The "changed" herein may be increased or reduced. For example, when the attribute value of the target virtual operation object is the energy value of the target virtual operation object, and the target virtual operation object enters the target region, the energy value of the target virtual operation object is reduced.

In some embodiments, the continuously changing, an attribute value of the second virtual operation object within a second predetermined duration when the target region is the damage detection region and a second virtual operation object enters the target region includes:

continuously changing the attribute value of the second virtual operation object within the second predetermined duration after the second virtual operation object enters the target region when the target region is the damage detection region, the second virtual operation object enters the target region, and the attribute value of the second virtual operation object has not been set to be continuously changed within a third predetermined duration before the second virtual operation object enters the target region, and wherein the third predetermined duration being equal to the second predetermined duration.

In some embodiments, the continuously changing an attribute value of the second virtual operation object within a second predetermined duration when the target region is the damage detection region and a second virtual operation object enters the target region includes:

canceling continuous changes of the attribute value of the second virtual operation object within the fourth predetermined duration, and continuously changing the attribute value of the second virtual operation object within the second predetermined duration after the second virtual operation object enters the target region when the target region is the damage detection region, the second virtual operation object enters the target region, and the attribute value of the second virtual operation object has been set to be continuously changed within a fourth predetermined duration before the second virtual operation object enters the target region.

In some embodiments, the continuously changing an attribute value of the second virtual operation object within a second predetermined duration when the target region is the damage detection region and a second virtual operation object enters the target region includes:

continuously changing the attribute value of the second virtual operation object within a target duration after the second virtual operation object enters the target region when the target region is the damage detection region, the second virtual operation object enters the target region, and the attribute value of the second virtual operation object has been set to be continuously changed within a fifth predetermined duration before the second virtual operation object enters the target region, the target duration being a sum of the second predetermined duration and a remaining duration, and the remaining duration being a remaining duration in the fifth predetermined duration when the second virtual operation object enters the target region.

In some embodiments, the continuously changing an attribute value of the second virtual operation object within a second predetermined duration includes:

continuing to change the attribute value of the second virtual operation object when the second virtual operation object moves outside the target region and the second predetermined duration after the second virtual operation object enters the target region has not ended.

In some embodiments, the controlling of the first virtual operation object to throw the target virtual throw prop when a target throw operation is detected includes:

setting a state of the target virtual throw prop to a throw ready state, and displaying a throw route in the target game application when a first touch operation performed for a virtual throw button of the target virtual throw prop is detected, and controlling the first virtual operation object to throw the target virtual throw prop according to the throw route when the target virtual throw prop is in the throw ready state and a second touch operation performed for the virtual throw button is detected, the target throw operation including the first touch operation and the second touch operation.

In some embodiments, the displaying a throw route in the target game application includes:

displaying a first parabola from a first position to a second position in the target game application, and using the first parabola as the throw route, the first position being a position of the target virtual throw prop, and the second position being a predicted point of fall of the target virtual throw prop.

In some embodiments, after the displaying a first parabola from a first position to a second position in the target game application, the method further includes:

displaying a second parabola from a third position to the second position in the target game application when the position of the target virtual throw prop is adjusted from the first position to the third position, the throw route being changed from the first parabola into the second parabola; or displaying a third parabola from the first position to a fourth position in the target game application when the predicted point of tall of the target virtual throw prop is adjusted from the second position to the fourth position, the throw route being changed from the first parabola into the third parabola; or displaying a fourth parabola from a fifth position to a sixth position in the target game application when the position of the target virtual throw prop is adjusted from the first position to the fifth position and the predicted point of fall of the target virtual throw prop is adjusted from the second position to the sixth position, the throw route being changed from the first parabola into the fourth parabola.

Figure 2:
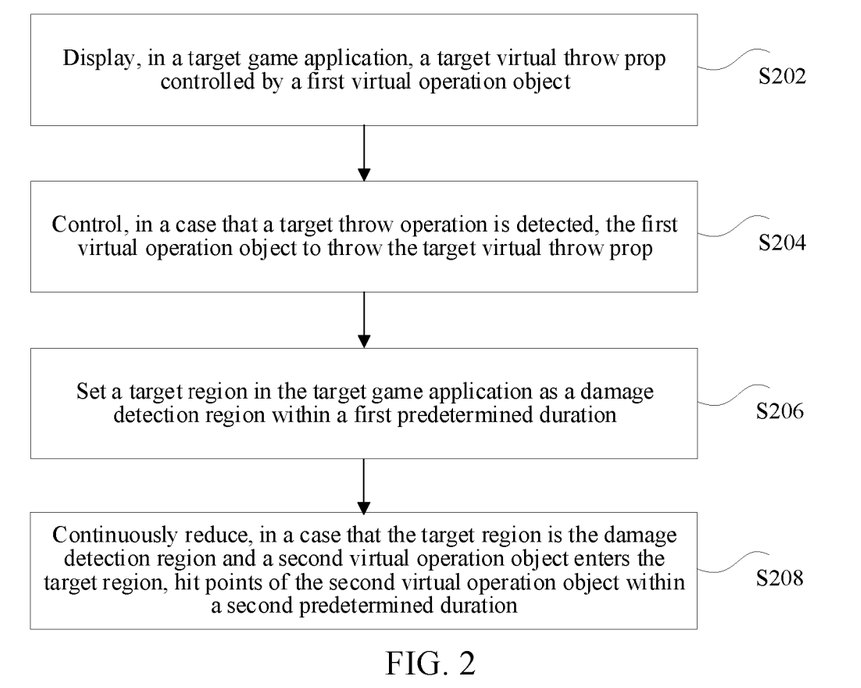
FIG. 2 is a flowchart of an exemplary virtual prop control method according to an example embodiment of the disclosure.

The following describes the virtual prop control method provided in the embodiments of the disclosure by using an example in which the attribute value is hit points. As shown in FIG. 2, the virtual prop control method provided in the embodiments of the disclosure may include the following steps:

S202: Display, in a target game application, a target virtual throw prop controlled by a first virtual operation object.

In embodiments, there may be a plurality of (at least two) virtual operation object sets participating in a round of a game currently run by the target game application, and each virtual operation object set may include one or more virtual operation objects. In some embodiments, virtual operation objects in a same virtual operation object set may belong to a same side. For example, there may be two virtual operation object sets participating in a round of game currently being run by the target game application: a first virtual operation object set and a second virtual operation object set respectively. Virtual operation objects in the first virtual operation object set may belong to a first side, and virtual operation objects in the second virtual operation object set may belong to a second side, and the two sides having a hostile relationship with each other.

S204: Control, in a case that a target throw operation is detected, the first virtual operation object to throw the target virtual throw prop, the target throw operation being used for throwing the target virtual throw prop. As an example, at S204, the first virtual operation object to throw the target virtual throw prop may be controlled when a target throw operation is detected, the target throw operation being used for throwing the target virtual throw prop.

S206: Set a target region in the target game application as a damage detection region within a fast predetermined duration, the target region including a point of fall to which the target virtual throw prop is thrown, the damage detection region being set to reduce hit points of at least one target virtual operation object located in the damage detection region, and the first virtual operation object and the at least one target virtual operation object respectively belonging to different virtual operation object sets in a plurality of virtual operation object sets. As an example, at S206, a target region in the target game application may be set as a damage detection region within a first predetermined duration, the target region including a point of fall to which the target virtual throw prop is thrown, the damage detection region being set to reduce hit points of at least one target virtual operation object located in the damage detection region, and the first virtual operation object and the at least one target virtual operation object respectively belonging to different virtual operation object sets in a plurality of virtual operation object sets S208: Continuously reduce, in a case that the target region is the damage detection region and a second virtual operation object enters the target region, hit points of the second virtual operation object within a second predetermined duration, the at least one target virtual operation object including the second virtual operation object. As an example, at S208, hit points of the second virtual operation object within a second predetermined duration may be continuously reduced when the target region is the damage detection region and a second virtual operation object enters the target region, wherein the at least one target virtual operation object includes the second virtual operation object.

In some embodiments, the target game application may include, but may not be limited to, all games that use hot weapons for long-range attack, such as a first-person shooting game and a third-person shooting game. The target game application may be a multiplayer online battle arena (MOBA) game or a single-player game (SPG). The type of the game application may include, but not limited to, at least one of the following: a two-dimensional (2D) game application, a three-dimensional (3D) game application, a virtual reality (VR) game application, an augmented reality (AR) game application, and a mixed reality (MR) game application.

In some embodiments, the target game application include, but may not be limited to, a target shooting application running in the game client logged in by a target account, and the target account controls a first virtual operation object. In other words, a player logs in to the target game application running in the game client through the account, and controls the first virtual operation object. A game picture of a target game application is displayed in a display screen of a mobile terminal on which the client running the target game application is located, and a target virtual throw prop is displayed in the game picture. The virtual throw prop may be in a shape of, but may not be limited to, a firebomb.

In some embodiments, the player touches the mobile terminal running the target game application, and then the target game application detects a target throw operation. The player controls the first virtual operating object to throw the target virtual throw prop.

In some embodiments, when a collision occurs between the target virtual throw prop and a point of fall to which the target virtual throw prop is thrown, a target region in which the point of fall is located is set as a damage detection region within a first predetermined duration, and a burning fame is displayed in the damage detection region. A virtual object may be a virtual ground in a virtual game environment or another virtual obstacle. In other words, the target virtual throw prop can only explode when colliding with a specific virtual thing. For example, by throwing the target virtual throw prop at a point A on the virtual ground, a burning flame can be released in a space with the point A as a radius.

A target virtual throw prop controlled by a first virtual operation object is displayed in a target game application, there being a plurality of virtual operation object sets participating in a round of the game currently run by the target game application; when a target throw operation is detected, the first virtual operation object is controlled to throw the target virtual throw prop, the target throw operation being used for throwing the target virtual throw prop; and a target region in the target game application is set as a damage detection region within a first predetermined duration, the target region including a point of fall to which the target virtual throw prop is thrown, the damage detection region being set to reduce hit points of at least one target virtual operation object located in the damage detection region. In some embodiments, the at least one target virtual operation object may include, but may not be limited to, a second virtual operation object, for example, a virtual object controlled by the player's team and the enemy team, or a non-player. The first predetermined duration and the second predetermined duration may include, but may not be limited to, fixed durations or changing durations. A reduction amount of the hit points may be, but not limited to, fixed or changing.

Figure 3:
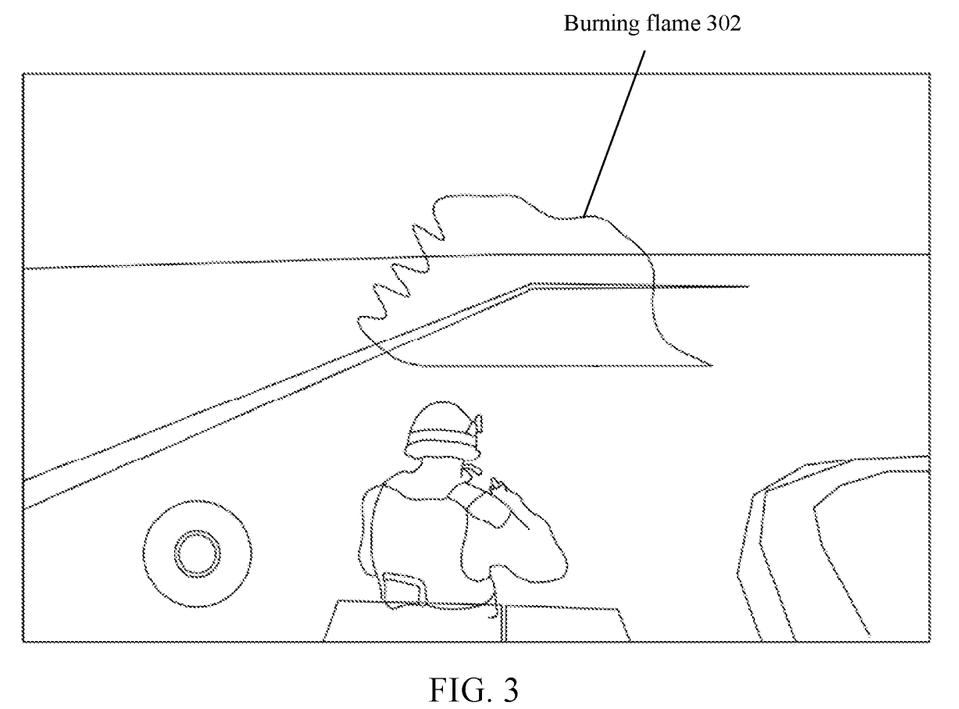
FIG. 3 is an exemplary illustration of a virtual prop control method according to an example embodiment of the disclosure.

For example, FIG. 3 is a schematic diagram of a virtual prop control method according to an example embodiment of the disclosure. As shown in FIG. 3, a region covered by a burning flame 302 is a damage detection region. In some embodiments, the first virtual operation object is controlled to throw the target virtual throw prop; the burning flame 302 is diffusely displayed in the target region by using the point of fall to which the target virtual throw prop is thrown as a center; a region covered by the burning flame 302 is set as a damage detection region; and the region covered by the burning flame 302 is set to reduce hit points of at least one target virtual operation object located in the damage detection region.

In some embodiments, when a second virtual operation object enters the damage detection region, the second virtual operation object begins to continuously lose hit points; when the damage detection region entered by the second virtual operation object exists and an existing duration reaches the first predetermined duration, the damage detection region disappears, and the second virtual operation object continuously loses hit points within the second predetermined duration; and when the second virtual operation object leaves the damage detection region, the second virtual operation object continuously loses hit points within the second predetermined duration. In other words, that the second virtual operation object continuously loses hit points within the second predetermined duration may include, but may not be limited to, that after a duration in which the second virtual operation object continuously loses hit points reaches the second predetermined duration, the second virtual operation object stops continuously losing hit points.

According to an embodiment, the target region in the target game application is set as the damage detection region within the first predetermined duration, the target region including the point of fall to which the target virtual throw prop is thrown, the damage detection region being set to reduce hit points of at least one target virtual operation object located in the damage detection region, and the first virtual operation object and the at least one target virtual operation object respectively belonging to different virtual operation object sets in a plurality of virtual operation object sets. By setting the target region in which the point of fall to which the target virtual throw prop is thrown as the damage detection region for reducing hit points of at least one target virtual operation object located in the damage detection region, the target virtual throw prop may be controlled to cause continuous damage to the enemy, achieving the effect of improving diversity of control manners of virtual throw props.

In some embodiments, the continuously reducing, when the target region is the damage detection region and a second virtual operation object enters the target region, hit points of the second virtual operation object within a second predetermined duration includes:

continuously reducing, when the target region is the damage detection region, the second virtual operation object enters the target region, and the second virtual operation object has not been set to continuously lose the hit points within a third predetermined duration before entering the target region, the hit points of the second virtual operation object within the second predetermined duration after the second virtual operation object enters the target region, the third predetermined duration being equal to the second predetermined duration.

In some embodiments, when the target region is the damage detection region, the second virtual operation object enters the target region, and the second virtual operation object has not been set to continuously lose the hit points within the third predetermined duration before entering the target region, the hit points of the second virtual operation object are continuously reduced within the second predetermined duration after the second virtual operation object enters the target region, the third predetermined duration being equal to the second predetermined duration.

Figure 4:
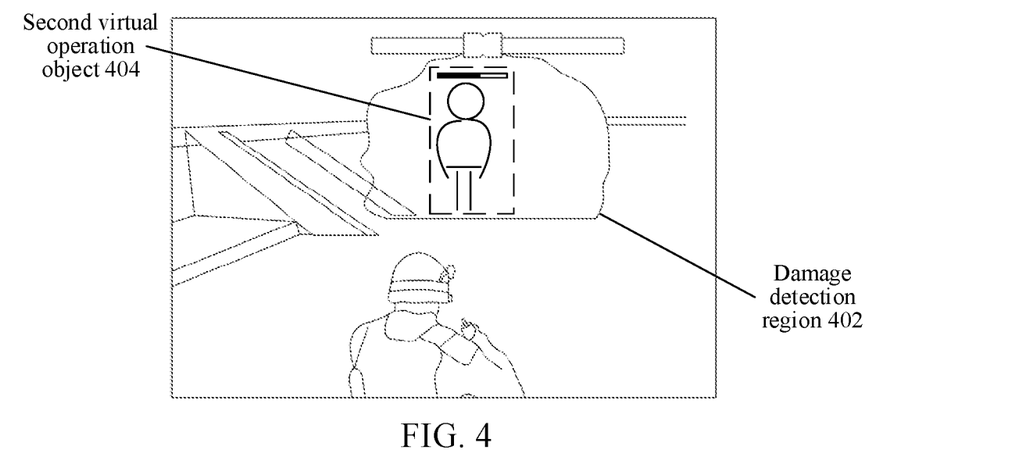
FIG. 4 is an exemplary illustration of a virtual prop control method according to an example embodiment of the disclosure.

For example, FIG. 4 is a schematic diagram of a virtual prop control method according to an example embodiment of the disclosure. As shown in FIG. 4, it is assumed that when a second virtual operation object 404 does not continuously lose hit points and enters a damage detection region 402, the hit points of the second virtual operation object 404 are continuously reduced within the second predetermined duration may be shown as, but may not be limited to, a shortening health bar (where a black part becomes shorter) above the second virtual operation object 404.

According to an embodiment, when the target region is the damage detection region, the second virtual operation object enters the target region, and the second virtual operation object has not been set to continuously lose the hit points within the third predetermined duration before entering the target region, the hit points of the second virtual operation object are continuously reduced within the second predetermined duration after the second virtual operation object enters the target region. By determining a duration of continuously reducing the hit points of the second virtual operation object, a continuous damage duration may be effectively and rationally calculated.

In some embodiments, the continuously reducing, when the target region is the damage detection region and a second virtual operation object enters the target region, hit points of the second virtual operation object within a second predetermined duration includes:

when the target region is the damage detection region, the second virtual operation object enters the target region, and the second virtual operation object has been set to continuously lose the hit points within a fourth predetermined duration before entering the target region, canceling continuous reduction of the hit points of the second virtual operation object within the fourth predetermined duration, and continuously reducing the hit points of the second virtual operation object within the second predetermined duration after the second virtual operation object enters the target region.

In some embodiments, when the target region is the damage detection region, the second virtual operation object enters the target region, and the second virtual operation object has been set to continuously lose the hit points within the fourth predetermined duration before entering the target region, continuous reduction of the hit points of the second virtual operation object within the fourth predetermined duration is canceled, and the hit points of the second virtual operation object are continuously reduced within the second predetermined duration after the second virtual operation object enters the target region.

For example, as shown in FIG. 4, assuming that the second virtual operation object 404 continuously loses hit points within the fourth predetermined duration, and enters the damage detection region 402, that the hit points of the second virtual operation object 404 begin to be continuously reduced within the second predetermined duration may be shown as, but may not be limited to, a shortening health bar (where a black part becomes shorter) above the second virtual operation object 404.

According to an embodiment, when that the target region is the damage detection region, the second virtual operation object enters the target region, and the second virtual operation object has been set to continuously lose the hit points within the fourth predetermined duration before entering the target region, continuous reduction of the hit points of the second virtual operation object within the fourth predetermined duration is canceled, and the hit points of the second virtual operation object are continuously reduced within the second predetermined duration after the second virtual operation object enters the target region. By determining a duration of continuously reducing the hit points of the second virtual operation object, a continuous damage duration may be effectively and rationally calculated.

In some embodiments, the continuously reducing, when the target region is the damage detection region and a second virtual operation object enters the target region, hit points of the second virtual operation object within a second predetermined duration includes:

continuously reducing, when the target region is the damage detection region, the second virtual operation object enters the target region, and the second virtual operation object has been set to continuously lose the hit points within a fifth predetermined duration before entering the target region, the hit points of the second virtual operation object within a target duration after the second virtual operation object enters the target region, the target duration being a sum of the second predetermined duration and a remaining duration, and the remaining duration being a remaining duration in the fifth predetermined duration when the second virtual operation object enters the target region.

In some embodiments, when the target region is the damage detection region, the second virtual operation object enters the target region, and the second virtual operation object has been set to continuously lose the hit points within the fifth predetermined duration before entering the target region, the hit points of the second virtual operation object are continuously reduced within the target duration after the second virtual operation object enters the target region, the target duration being the sum of the second predetermined duration and the remaining duration, and the remaining duration being a remaining duration in the fifth predetermined duration when the second virtual operation object enters the target region. The fifth predetermined duration may include, but may not be limited to, equal to the second predetermined duration.

For example, as shown in FIG. 4, when the second virtual operation object 404 enters the damage detection region 402, the hit points of the second virtual operation object 404 are continuously reduced within the second predetermined duration; and assuming that it is detected that the second virtual operation object 404 leaves the damage detection region 402, the second virtual operation object 404 is continuously damaged within the fifth predetermined duration. In addition, when a remaining duration in the fifth predetermined duration exists, and it is detected that the second virtual operation object 404 enters the damage detection region 402 again, the second virtual operation object 404 being continuously damaged within a duration sum of the second predetermined duration and the remaining duration in the fifth predetermined duration may be shown as, but may not be limited to, as a continuously shortening health bar (where a black part continuously becomes shorter) above the second virtual operation object 404.

According to an embodiment, when the target region is the damage detection region, the second virtual operation object enters the target region, and the second virtual operation object has been set to continuously lose the hit points within the fifth predetermined duration before entering the target region, the hit points of the second virtual operation object are continuously reduced within the target duration after the second virtual operation object enters the target region. By determining a duration of continuously reducing the hit points of the second virtual operation object, a continuous damage duration may be effectively and rationally calculated.

In some embodiments, the continuously reducing hit points of the second virtual operation object within a second predetermined duration includes:

continuing to reduce the hit points of the second virtual operation object when the second virtual operation object moves outside the target region and the second predetermined duration after the second virtual operation object enters the target region has not ended.

In some embodiments, when the second virtual operation object moves outside the target region and the second predetermined duration after the second virtual operation object enters the target region has not ended, the hit points of the second virtual operation object continue to be reduced.

For example, as shown in FIG. 4, assuming that a duration of continuously reducing the hit points of the second virtual operation object 404 reaches the second predetermined duration, whether the second virtual operation object 404 is still located in the damage detection region 402 is detected; and when it is determined that the second virtual operation object 404 is still located in the damage detection region 402, the hit points of the second virtual operation object 404 continue to be continuously reduced within the second predetermined duration; and in a case that it is determined that the second virtual operation object 404 is not located in the damage detection region 402, stopping continuous reduction of the hit points of the second virtual operation object 404 may be shown as, but may not be limited to, a health bar above the second virtual operation object 404 stops becoming shorter (where a black part stops becoming shorter).

According to an embodiment, in a case that the second virtual operation object moves outside the target region and the second predetermined duration after the second virtual operation object enters the target region has not ended, the hit points of the second virtual operation object continue to be reduced. When the second virtual operation object moves outside the target region, the hit points of the second virtual operation object can still be reduced, so that the virtual prop is continuously effective, achieving the objective of improving efficiency in controlling the virtual prop.

In some embodiments, the controlling, when a target throw operation is detected, the first virtual operation object to throw the target virtual throw prop includes:

S1: when a first touch operation performed for a virtual throw button of the target virtual throw prop is detected, setting a state of the target virtual throw prop to a throw ready state, and displaying a throw route in the target game application; and S2: controlling, when the target virtual throw prop is in the throw ready state and a second touch operation performed for the virtual throw button is detected, the first virtual operation object to throw the target virtual throw prop according to the throw route, the target throw operation including the first touch operation and the second touch operation.

In some embodiments, when the first touch operation performed for the virtual throw button of the target virtual throw prop is detected, the state of the target virtual throw prop is set to the throw ready state, and the throw route is displayed in the target game application; and when the target virtual throw prop is in the throw ready state, and the second touch operation performed for the virtual throw button is detected, the first virtual operation object is controlled to throw the target virtual throw prop according to the throw route. In some embodiments, the first touch operation or the second touch operation may include, but may not be limited to, at least one of the following: a predetermined region selection operation, a predetermined duration continuous selection operation, a predetermined direction slide operation, a predetermined region slide operation, or the like.

Figure 5:
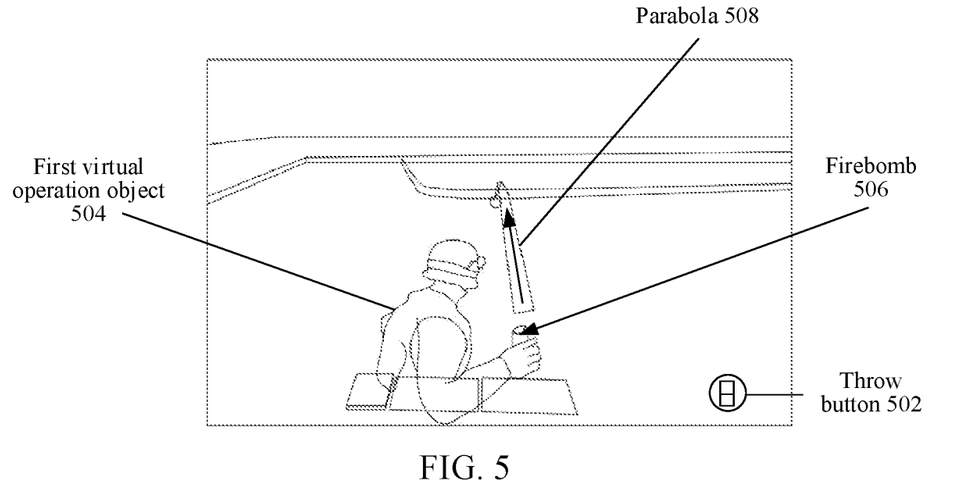
FIG. 5 is an exemplary illustration of a virtual prop control method according to an example embodiment of the disclosure.

For example, FIG. 5 is a schematic diagram of a virtual prop control method according to an embodiment of the disclosure. As shown in FIG. 5, it is assumed that a firebomb 506 is the target virtual throw prop, a parabola 508 is the throw route, a throw button 502 is the virtual throw button, a first virtual operation object 504 is the controlled first virtual operation object, the first touch operation is a predetermined region selection operation, and the second touch operation is a predetermined direction slide operation. The predetermined region is a region in which the virtual throw button is located, and a direction of a final throw route of the target virtual throw prop may be, but may not be limited to, the foregoing predetermined direction (shown by an arrow on the parabola 508 in the figure). In some embodiments, the throw button 502 is selected, a state of the firebomb 506 is set to a throw ready state, and the parabola 508 is displayed in the target game application. In addition, when a predetermined direction slide operation performed for the throw button 502 is detected, the first virtual operation object 504 is controlled to throw the firebomb 506 according to the parabola 508.

According to an embodiment, when the first touch operation performed for the virtual throw button of the target virtual throw prop is detected, the state of the target virtual throw prop is set to the throw ready state, and the throw route is displayed in the target game application; and when the target virtual throw prop is in the throw ready state and the second touch operation performed for the virtual throw button is detected, the first virtual operation object is controlled to throw the target virtual throw prop according to the throw route, effectively improving the controllability of the target virtual throw prop.

In some embodiments, the displaying a throw route in the target game application includes:

displaying a first parabola from a first position to a second position in the target game application, and using the first parabola as the throw route, the first position being a position of the target virtual throw prop, the second position being a predicted point of fall of the target virtual throw prop, and the throw route including the first parabola.

The first parabola from the first position to the second position is displayed in the target game application.

Figure 6:
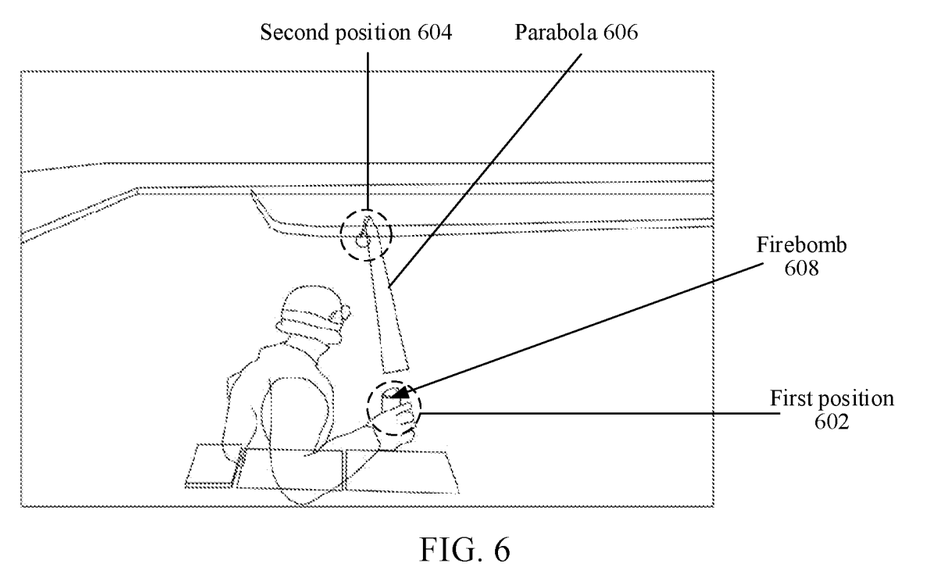
FIG. 6 is an exemplary illustration of a virtual prop control method according to an example embodiment of the disclosure.

For example, FIG. 6 is a schematic diagram of a virtual prop control method according to an embodiment of the disclosure. As shown in FIG. 6, for example, a firebomb 608 is the target virtual throw prop, a first position 602 at which the firebomb 608 is located is the first position at which the target virtual throw prop is located, a second position 604 at which a predicted point of fall of the firebomb 608 is located is the second position at which the predicted point of fall of the target virtual throw prop is located, and a parabola 606 is the first parabola included in the throw route. In some embodiments, the parabola 606 from the first position 602 at which the firebomb 608 is located to the second position 604 at which the predicted point of fall of the firebomb 608 is located is displayed in the target game application.

By displaying the first parabola from the first position to the second position in the target game application, and displaying a start position, a position of the predicted point of fall, and a predicted throw route of the target virtual throw prop, the difficulty in controlling the target virtual throw prop is reduced.

In some embodiments, after the displaying a first parabola from a first position to a second position in the target game application, the method further includes:

S1: displaying, when the position of the target virtual throw prop is adjusted from the first position to a third position, a second parabola from the third position to the second position in the target game application, the throw route being changed from the first parabola into the second parabola; or S2: displaying, when the predicted point of fall of the target virtual throw prop is adjusted from the second position to a fourth position, a third parabola from the first position to the fourth position in the target game application, the throw route being changed from the first parabola into the third parabola; or S3: displaying, when the position of the target virtual throw prop is adjusted from the first position to a fifth position and the predicted point of fall of the target virtual throw prop is adjusted from the second position to a sixth position, a fourth parabola from the fifth position to the sixth position in the target game application, the throw route being changed from the first parabola into the fourth parabola.

In some embodiments, when the position of the target virtual throw prop is adjusted from the first position to the third position, the second parabola from the third position to the second position is displayed in the target game application, the throw route being changed from the first parabola into the second parabola.

For example, when the entire body (for example, during walking, running, or jumping) or part of the body (for example, during leaning or squatting) of the first virtual operation object moves, the position of the target virtual throw prop is also changed, so that the parabola displayed in the target game application is also changed with the change of the position of the target virtual throw prop.

In some embodiments, when the predicted point of fall of the target virtual throw prop is adjusted from the second position to the fourth position, the third parabola from the first position to the fourth position is displayed in the target game application, the throw route being changed from the first parabola into the third parabola.

For example, when an attack direction of the first virtual operation object is changed (for example, due to a change of an aiming angle or turning), although the position of the target virtual throw prop is not changed, the position of the predicted point of fall of the target virtual throw prop is changed, so that the parabola displayed in the target game application is also changed reflecting the change of the position of the predicted point of fall of the target virtual throw prop.

In some embodiments, when the position of the target virtual throw prop is adjusted from the first position to the fifth position and the predicted point of fall of the target virtual throw prop is adjusted from the second position to the sixth position, the fourth parabola from the fifth position to the sixth position is displayed in the target game application, the throw route being changed from the first parabola into the fourth parabola.

For example, when the entire body (for example, during walking, running, or jumping) or part of the body (for example, during leaning or squatting) of the first virtual operation object moves, and the attack direction is changed, both the position of the target virtual throw prop and the position of the predicted point of fall of the target virtual throw prop are changed, so that the parabola displayed in the target game application is also changed to reflect the change in the position of the target virtual throw prop and the change in the position of the predicted point of fall of the target virtual throw prop.

According to an embodiment, the parabola displayed in the target game application is changed with the change of the position of the target virtual throw prop and the position of the predicted point of fall of the target virtual throw prop, improving the flexibility in displaying the parabola in the target game application.

For the ease of description, the foregoing method embodiments are expressed as a series of action combinations, but a person skilled in the art is to learn that because some steps may be performed in other sequences or simultaneously according to the embodiments of the disclosure, the embodiments of the disclosure are not limited to the described action sequence. In addition, a person skilled in the art is also to learn that the embodiments described in this specification are all exemplary embodiments, and the involved actions and modules are not necessarily required to the embodiments of the disclosure.

Figure 7:
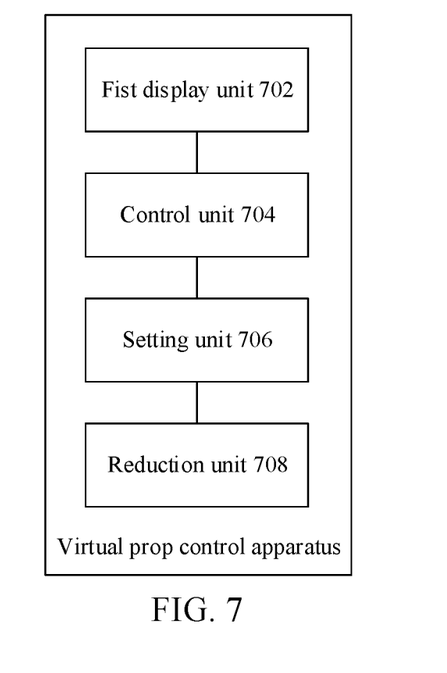
FIG. 7 is a schematic structural diagram of a virtual prop control apparatus according to an example embodiment of the disclosure.

An embodiment of the disclosure further provides a virtual prop control apparatus configured to perform the foregoing virtual prop control method. As shown in FIG. 7, the apparatus includes:

a first display unit 702, configured to display, in a target game application, a target virtual throw prop controlled by a first virtual operation object, there being a plurality of virtual operation object sets participating in a round of game currently run by the target game application;

a control unit 704, configured to control, when a target throw operation is detected, the first virtual operation object to throw the target virtual throw prop, the target throw operation being used for throwing the target virtual throw prop;

a setting unit 706, configured to set a target region in the target game application as a damage detection region within a first predetermined duration, the target region including a point of fall to which the target virtual throw prop is thrown, the damage detection region being set to reduce hit points of at least one target virtual operation object located in the damage detection region, and the first virtual operation object and the at least one target virtual operation object respectively belonging to different virtual operation object sets in the plurality of virtual operation object sets; and a reduction unit 708, configured to continuously reduce, when the target region is the damage detection region and a second virtual operation object enters the target region, hit points of the second virtual operation object within a second predetermined duration, the at least one target virtual operation object including the second virtual operation object.

In some embodiments, the reduction unit 708 includes:

a first reduction module, configured to continuously reduce, when the target region is the damage detection region, the second virtual operation object enters the target region, and the second virtual operation object has not been set to continuously lose the hit points within a third predetermined duration before entering the target region, the hit points of the second virtual operation object within the second predetermined duration after the second virtual operation object enters the target region, the third predetermined duration being equal to the second predetermined duration.

In some embodiments, the reduction unit 708 includes:

a second reduction module, configured to: when the target region is the damage detection region, the second virtual operation object enters the target region, and the second virtual operation object has been set to continuously lose the hit points within a fourth predetermined duration before entering the target region, cancel continuous reduction of the hit points of the second virtual operation object within the fourth predetermined duration, and continuously reduce the hit points of the second virtual operation object within the second predetermined duration after the second virtual operation object enters the target region.

In some embodiments, the reduction unit 708 includes:

a third reduction module, configured to continuously reduce, when the target region is the damage detection region, the second virtual operation object enters the target region, and the second virtual operation object has been set to continuously lose the hit points within a fifth predetermined duration before entering the target region, the hit points of the second virtual operation object within a target duration after the second virtual operation object enters the target region, the target duration being a sum of the second predetermined duration and a remaining duration, and the remaining duration being a remaining duration in the fifth predetermined duration when the second virtual operation object enters the target region.

In some embodiments, the reduction unit 708 includes:

a fourth reduction module, configured to continue to reduce the hit points of the second virtual operation object when the second virtual operation object moves outside the target region and the second predetermined duration after the second virtual operation object enters the target region has not ended.

In some embodiments, the control unit 704 includes:

a setting module, configured to: when a first touch operation performed for a virtual throw button of the target virtual throw prop is detected, set a state of the target virtual throw prop to a throw ready state, and display a throw route in the target game application; and a control module, configured to control, when the target virtual throw prop is in the throw ready state and a second touch operation performed for the virtual throw button is detected, the first virtual operation object to throw the target virtual throw prop according to the throw route, the target throw operation including the first touch operation and the second touch operation.

In some embodiments, the setting module includes:

a display submodule, configured to display a first parabola from a first position to a second position in the target game application, the first position being a position of the target virtual throw prop, the second position being a predicted point of fall of the target virtual throw prop, and the throw route including the first parabola.

In some embodiments, the apparatus further includes:

a second display unit, configured to display, after the first parabola from the first position to the second position is displayed in the target game application and when the position of the target virtual throw prop is adjusted from the first position to a third position, a second parabola from the third position to the second position in the target game application, the throw route being changed from the first parabola into the second parabola; or a third display unit, configured to display, after the first parabola from the first position to the second position is displayed in the target game application and when the predicted point of fall of the target virtual throw prop is adjusted from the second position to a fourth position, a third parabola from the first position to the fourth position in the target game application, the throw route being changed from the first parabola into the third parabola; or a fourth display unit, configured to display, after the first parabola from the first position to the second position is displayed in the target game application and when the position of the target virtual throw prop is adjusted from the first position to a fifth position and the predicted point of fall of the target virtual throw prop is adjusted from the second position to a sixth position, a fourth parabola from the fifth position to the sixth position in the target game application, the throw route being changed from the first parabola into the fourth parabola.

Figure 8:
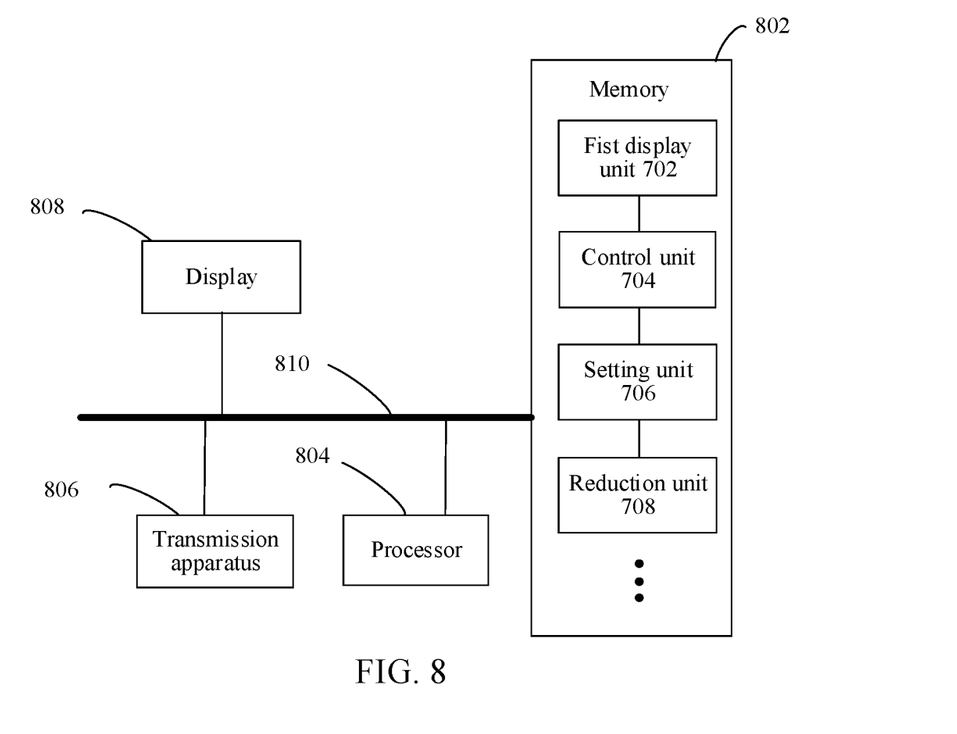
FIG. 8 is a schematic structural diagram of an electronic device according to an example embodiment of the disclosure.

An embodiment of the disclosure further provides an electronic device configured to perform the foregoing virtual prop control method. In actual application, the electronic device may be a terminal or a server. As shown in FIG. 8, the electronic device includes a memory 802 and a processor 804. The memory 802 stores a computer program. The processor 804 is configured to perform steps in any one of the foregoing method embodiments through the computer program.

In some embodiments, the electronic device may be located in at least one of a plurality of network devices in a computer network.

In some embodiments, the processor may be configured to perform the following steps through the computer program:

S1: displaying, in a target game application, a target virtual throw prop controlled by a first virtual operation object, there being a plurality of virtual operation object sets participating in a round of game currently run by the target game application;

S2: controlling, when a target throw operation is detected, the first virtual operation object to throw the target virtual throw prop, the target throw operation being used for throwing the target virtual throw prop;

S3: setting a target region in the target game application as a damage detection region within a first predetermined duration, the target region including a point of fall to which the target virtual throw prop is thrown, the damage detection region being set to reduce hit points of at least one target virtual operation object located in the damage detection region, and the first virtual operation object and the at least one target virtual operation object respectively belonging to different virtual operation object sets in a plurality of virtual operation object sets; and S4: continuously reducing, when the target region is the damage detection region and a second virtual operation object enters the target region, hit points of the second virtual operation object within a second predetermined duration, the at least one target virtual operation object including the second virtual operation object.

A person of ordinary skill in the art may understand that, the structure shown in FIG. 8 is only schematic. The electronic device may be a terminal device such as a smartphone (such as an Android mobile phone or an iOS mobile phone), a tablet computer, a palmtop computer, a mobile internet device (MID), or a PAD. FIG. 8 does not limit the structure of the electronic device. For example, the electronic device may further include more or fewer components (such as a network interface) than those shown in FIG. 8, or have a configuration different from that shown in FIG. 8.

The memory 802 may be configured to store software programs and modules, for example, program instructions/modules corresponding to the virtual prop control method and apparatus in the embodiments of the disclosure. The processor 804 runs the software programs and modules stored in the memory 802, to perform various functional applications and data processing, to be specific, implement the foregoing virtual prop control method. The memory 802 may include a high-speed random access memory, and may also include a non-volatile memory, for example, one or more magnetic storage apparatuses, a flash memory, or another non-volatile solid-state memory. In some examples, the memory 802 may further include memories remotely disposed relative to the processor 804, and the remote memories may be connected to a terminal through a network. The foregoing examples of the network include, but not limited to, the Internet, an intranet, a local area network, a mobile communication network, and a combination thereof. The memory 802 may be specifically configured to store, but not limited to, information such as a target virtual throw prop, a virtual operation object set, a damage detection region, and hit points of the target virtual operation object. For example, as shown in FIG. 8, the memory 802 may include, but is not limited to, a first display unit 702, a control unit 704, a setting unit 706, and a reduction unit 708 in the virtual prop control apparatus. In addition, the memory may further include, but is not limited to, other module units in the virtual prop control apparatus. The other module units are not described in detail in this example.

In some embodiments, a transmission apparatus 806 is configured to receive or transmit data through a network. Specific instances of the foregoing network may include a wired network and a wireless network. For example, the transmission apparatus 806 includes a network interface controller (NIC). The NIC may be connected to another network device and a router by using a network cable, so as to communicate with the Internet or a local area network. For example, the transmission apparatus 806 is a radio frequency (RF) module, which communicates with the Internet in a wireless manner.

In addition, the electronic device further includes: a display 808 configured to display information such as a target virtual throw prop, a virtual operation object set, a damage detection region, and hit points of the target virtual operation object; and a connection bus 810, configured to connect various module components in the electronic device.

An embodiment of the disclosure further provides a computer-readable storage medium, storing a computer program, the computer program being configured to perform, when run, the virtual prop control method provided in the embodiments of the disclosure.

In some embodiments, the computer-readable storage medium may be configured to store a computer program for performing the following steps:

S1: displaying, in a target game application, a target virtual throw prop controlled by a first virtual operation object, there being a plurality of virtual operation object sets participating in a round of game currently run by the target game application;

S2: controlling, when a target throw operation is detected, the first virtual operation object to throw the target virtual throw prop, the target throw operation being used for throwing the target virtual throw prop;

S3: setting a target region in the target game application as a damage detection region within a first predetermined duration, the target region including a point of fall to which the target virtual throw prop is thrown, the damage detection region being set to reduce hit points of at least one target virtual operation object located in the damage detection region, and the first virtual operation object and the at least one target virtual operation object respectively belonging to different virtual operation object sets in a plurality of virtual operation object sets; and S4: continuously reducing, when the target region is the damage detection region and a second virtual operation object enters the target region, hit points of the second virtual operation object within a second predetermined duration, the at least one target virtual operation object including the second virtual operation object.

In this embodiment, a person of ordinary skill in the art may understand that all or some of the steps of the methods in the foregoing embodiments may be implemented by a program instructing relevant hardware of the terminal device. The program may be stored in a computer-readable storage medium, and the storage medium may include a flash disk, a read-only memory (ROM), a random access memory (RAM), a magnetic disk, an optical disc, or the like.

When the integrated unit in the foregoing embodiments is implemented in the form of a software functional unit and sold or used as an independent product, the integrated unit may be stored in the foregoing computer-readable storage medium. Based on such an understanding, the technical solutions of the disclosure essentially, or the part contributing to the related art, or the entire or some of the technical solutions may be implemented in a form of a software product. The computer software product is stored in a storage medium and includes several instructions for instructing one or more computer devices (which may be a personal computer, a server, a network device, or the like) to perform all or some of the steps of the methods described in the embodiments of the disclosure.

In the foregoing embodiments of the disclosure, descriptions of the embodiments have different emphases. As for parts that are not described in detail in one embodiment, reference may be made to the relevant descriptions of the other embodiments.

In the several embodiments provided in the disclosure, it is to be understood that the disclosed client may be implemented in other manners. The described apparatus embodiments are merely exemplary. For example, the unit division is merely logical function division, and may use other division manners during actual implementation. For example, a plurality of units or components may be combined or integrated into another system, or some features may be omitted or not performed. In addition, the coupling, or direct coupling, or communication connection between the displayed or discussed components may be the indirect coupling or communication connection by using some interfaces, units, or modules, and may be electrical or of other forms.

The units described as separate components may or may not be physically separate, and components displayed as units may or may not be physical units, may be located in one position, or may be distributed on a plurality of network units. Some or all of the units may be selected according to actual needs to achieve the objectives of the solutions of the embodiments.

In addition, functional units in the embodiments of the disclosure may be integrated into one processing unit, or each of the units may exist alone physically, or two or more units may be integrated into one unit. The integrated unit may be implemented in a form of hardware, or may be implemented in a form of a software functional unit.

The foregoing descriptions are merely exemplary implementations of the disclosure. A person of ordinary skill in the art may further make several improvements and modifications without departing from the principle of the disclosure, and the improvements and modifications are also considered as falling within the protection scope of the disclosure.

INDUSTRIAL PRACTICABILITY

In the embodiments of the disclosure, a target virtual throw prop controlled by a first virtual operation object is displayed in a target game application; when a target throw operation is detected, the first virtual operation object is controlled to throw the target virtual throw prop, the target throw operation being used for throwing the target virtual throw prop; a target region in the target game application is set as a damage detection region within a first predetermined duration, the target region including a point of fall to which the target virtual throw prop is thrown, the damage detection region being set to reduce hit points of at least one target virtual operation object located in the damage detection region, and the first virtual operation object and the at least one target virtual operation object respectively belonging to different virtual operation object sets; and when the target region is the damage detection region and a second virtual operation object enters the target region, hit points of the second virtual operation object are continuously reduced within a second predetermined duration, the at least one target virtual operation object including the second virtual operation object. In this way, a case in which single damage is caused to only a virtual operation object hit by a virtual throw prop no longer exists, so as to improve diversity of control manners of virtual throw props.

What is claimed is:

1. A virtual prop control method, performed by an electronic device, the method comprising:
   displaying, in a target game application, a target virtual throw prop controlled by a first virtual operation object;
   controlling the first virtual operation object to throw the target virtual throw prop, a target throw operation being used for throwing the target virtual throw prop;
   setting a target region in the target game application as a region surrounding a point at which the target virtual throw prop is thrown,
       wherein the target region is set to reduce hit points of at least one target virtual operation object located in the target region for a first predetermined duration, and
       wherein the first virtual operation object and the at least one target virtual operation object respectively belong to different virtual operation object sets;
   based on a second virtual operation object being set to continuously lose hit points within a second predetermined duration before entering the target region, canceling said continuous loss of the hit points of the second virtual operation object within the second predetermined duration when the second virtual operation object enters the target region with a remaining time remaining in the second predetermined duration;
   reducing the hit points of the second virtual operation object at a predetermined rate within a third predetermined duration after the second virtual operation object enters the target region; and
   continuously reducing the hit points of the second virtual operation object for the remaining time after the second virtual operation object exits the target region.

2. The method according to claim 1, wherein the controlling comprises:
   setting a state of the target virtual throw prop to a throw ready state, based on a first touch operation performed for a virtual throw button of the target virtual throw prop being detected, and displaying a throw route in the target game application; and
   controlling the first virtual operation object to throw the target virtual throw prop according to the throw route, based on the target virtual throw prop being in the throw ready state and a second touch operation performed for the virtual throw button being detected,
   the target throw operation comprising the first touch operation and the second touch operation.

3. The method according to claim 2, wherein the displaying the throw route in the target game application comprises:
   displaying a first parabola from a first position to a second position in the target game application, and using the first parabola as the throw route,
   the first position being a position of the target virtual throw prop, and the second position being a predicted point of fall of the target virtual throw prop.

4. The method according to claim 3, further comprising:
   displaying a second parabola from a third position to the second position in the target game application, based on the position of the target virtual throw prop being adjusted from the first position to the third position, the throw route being changed from the first parabola into the second parabola; or
   displaying a third parabola from the first position to a fourth position in the target game application, based on the predicted point of fall of the target virtual throw prop being adjusted from the second position to the fourth position, the throw route being changed from the first parabola into the third parabola; or
   displaying a fourth parabola from a fifth position to a sixth position in the target game application, based on the position of the target virtual throw prop being adjusted from the first position to the fifth position and the predicted point of fall of the target virtual throw prop being adjusted from the second position to the sixth position, the throw route being changed from the first parabola into the fourth parabola.

5. A virtual prop control apparatus, comprising:
   at least one memory configured to store program code; and
   at least one processor configured to read the program code and operate as instructed by the program code, the program code comprising:
   first displaying code configured to cause the at least one processor to display, in a target game application, a target virtual throw prop controlled by a first virtual operation object;
   first controlling code configured to cause the at least one processor to control the first virtual operation object to throw the target virtual throw prop, a target throw operation being used for throwing the target virtual throw prop;

first setting code configured to cause the at least one processor to set a target region in the target game application as a region surrounding a point at which the target virtual throw prop is thrown, wherein the target region being is to change an attribute of at least one target virtual operation object located in the target region for a first predetermined duration, and wherein the first virtual operation object and the at least one target virtual operation object respectively belong to different virtual operation object sets;

first cancelling code configured to cause the at least one processor to cancel, based on a second virtual operation object being set to continuously lose hit points within a second predetermined duration before entering the target region, said continuous loss of the hit points of the second virtual operation object within the second predetermined duration when the second virtual operation object enters the target region with a remaining time remaining in the second predetermined duration;

first changing code configured to cause the at least one processor to change the attribute of the second virtual operation object at a predetermined rate within a third predetermined duration after the second virtual operation object enters the target region; and second changing code configured to cause the at least one processor to, continuously reduce the hit points of the second virtual operation object for the remaining time after the second virtual operation object exits the target region.

6. The apparatus according to claim 5, wherein the first controlling code comprises:

second setting code configured to cause the at least one processor to set a state of the target virtual throw prop to a throw ready state, based on a first touch operation performed for a virtual throw button of the target virtual throw prop being detected, and display a throw route in the target game application; and second controlling code configured to cause the at least one processor to control the first virtual operation object to throw the target virtual throw prop according to the throw route, based on the target virtual throw prop being in the throw ready state and a second touch operation performed for the virtual throw button being detected, the target throw operation comprising the first touch operation and the second touch operation.

7. The apparatus according to claim 6, wherein the displaying the throw route in the target game application comprises:

displaying a first parabola from a first position to a second position in the target game application, and using the first parabola as the throw route, the first position being a position of the target virtual throw prop, and the second position being a predicted point of fall of the target virtual throw prop.

8. The apparatus according to claim 7, wherein the program code further comprises:

second displaying code configured to cause the at least one processor to display a second parabola from a third position to the second position in the target game application, based on the position of the target virtual throw prop being adjusted from the first position to the third position, the throw route being changed from the first parabola into the second parabola; or third displaying code configured to cause the at least one processor to display a third parabola from the first position to a fourth position in the target game application, based on the predicted point of fall of the target virtual throw prop being adjusted from the second position to the fourth position, the throw route being changed from the first parabola into the third parabola; or fourth displaying code configured to cause the at least one processor to display a fourth parabola from a fifth position to a sixth position in the target game application, based on the position of the target virtual throw prop being adjusted from the first position to the fifth position and the predicted point of fall of the target virtual throw prop being adjusted from the second position to the sixth position, the throw route being changed from the first parabola into the fourth parabola.

9. The apparatus according to claim 5, wherein the attribute of the at least one target virtual operation object located in the target region or the attribute of the second virtual operation object is hit points.

10. The apparatus according to claim 5, wherein the attribute of the at least one target virtual operation object located in the target region or the attribute of the second virtual operation object is mana points.

11. The apparatus according to claim 5, wherein the attribute of the at least one target virtual operation object located in the target region or the attribute of the second virtual operation object is energy value.

12. A non-transitory computer-readable storage medium, storing a program that is executable by at least one processor to perform:

displaying, in a target game application, a target virtual throw prop controlled by a first virtual operation object;

controlling the first virtual operation object to throw the target virtual throw prop, a target throw operation being used for throwing the target virtual throw prop;

setting a target region in the target game application as a region surrounding a point at which the target virtual throw prop is thrown, wherein the target region is set to reduce hit points of at least one target virtual operation object located in the target region for a first predetermined duration, and wherein the first virtual operation object and the at least one target virtual operation object respectively belong to different virtual operation object sets;

based on a second virtual operation object being set to continuously lose hit points within a second predetermined duration before entering the target region, canceling said continuous loss of the hit points of the second virtual operation object within the second predetermined duration when the second virtual operation object enters the target region with a remaining time remaining in the second determined duration;

reducing the hit points of the second virtual operation object at a predetermined rate within a third predetermined duration after the second virtual operation object enters the target region; and continuously reducing the hit points of the second virtual operation object for the remaining time after the second virtual operation object exits the target region.

* * * * *